United States Patent [19]
Bauer et al.

[11] Patent Number: 5,338,119
[45] Date of Patent: Aug. 16, 1994

[54] LONGITUDINAL GUIDE FOR LONGITUDINAL ADJUSTMENT DEVICES FOR VEHICLE SEATS

[75] Inventors: Heinz Bauer; Burckhard Becker; Ernst-Reinhard Frohnhaus, all of Solingen, Del.

[73] Assignee: Firma C. Rob. Hammerstein GmbH, Fed. Rep. of Germany

[21] Appl. No.: 84,797

[22] Filed: Jun. 29, 1993

[51] Int. Cl.⁵ .................. B60N 2/06; F16C 29/04
[52] U.S. Cl. ................................. 384/47; 384/49
[58] Field of Search ..................... 384/47, 49, 55

[56] References Cited

U.S. PATENT DOCUMENTS

| | | | |
|---|---|---|---|
| 3,759,587 | 9/1973 | Christin | 384/47 |
| 4,569,563 | 2/1986 | Fourrey | 384/49 |
| 4,593,957 | 6/1986 | Hidano | 384/49 |
| 4,787,756 | 11/1988 | Pilarski | 384/47 |
| 4,892,282 | 1/1990 | Suzuki et al. | 384/47 X |

FOREIGN PATENT DOCUMENTS

| | | |
|---|---|---|
| 2451262 | 7/1975 | Fed. Rep. of Germany . |
| 2545763 | 4/1977 | Fed. Rep. of Germany . |
| 3143431 | 5/1983 | Fed. Rep. of Germany . |
| 2108380A | 11/1981 | United Kingdom ........... B60N 1/08 |

*Primary Examiner*—Thomas R. Hannon
*Attorney, Agent, or Firm*—Quarles & Brady

[57] ABSTRACT

A longitudinal guide for a seat sliding device for vehicle seats includes two elongated tracks that slide relative to each other. A guide is arranged between the tracks, there being at least two guides when viewed from the profile of the longitudinal guide, of which at least one is constructed using roller bodies. One track embraces the other track. The tracks are interconnected so that they will not separate. The tracks are positioned in an adjoined, preloaded manner. The tracks are manufactured of steel sheet containing at least 0.35% carbon content and are heat treated after they are complete.

29 Claims, 1 Drawing Sheet

LONGITUDINAL GUIDE FOR LONGITUDINAL ADJUSTMENT DEVICES FOR VEHICLE SEATS

FIELD OF THE INVENTION

The invention relates to a longitudinal guide for longitudinal adjustment devices for vehicle seats with two elongated tracks that slide relative to each other and
between which guiding means are arranged, of which there are at least two (as seen along the profile of a longitudinal guide), and of which at least one is constructed using roller bodies, preferably balls, with one track that embraces the other,
with the tracks interconnected such that they will not pull out, and
with the tracks positioned in an adjoined, preloaded manner.

BACKGROUND OF THE INVENTION

Such a longitudinal guide is known, for example, from DE-C-31 43 431. However, equivalent longitudinal guides are also taught by DE-OS 25 45 763 or DE-AS 24 51 262. The longitudinal guides specified therein are manufactured either of steel sheet metal, whereby the steel grades are those commonly used in the automobile industry, or they are made of extruded light metal, preferably aluminum. The latter construction has become more prominent during the last few years. The production of tracks made of aluminum satisfies the need of the automobile industry to save weight in vehicles. The market share for tracks for longitudinal guides made of steel has dropped during the last few years, while the market share for aluminum rails has increased during that time. This is due, in particular, to the lighter weight of an aluminum track of equivalent strength as compared to a steel track.

A longitudinal guide is prevented from pulling out if the safety belts are mounted to the seat itself, that is, belt traction forces due to an accident are transferred by means of the tracks of the longitudinal guide that is interconnected with the floor group of the motor vehicle. Longitudinal guides are considered pull=out proof if there is no risk that the longitudinal guide will tear away or tear open in a zipper like manner in the event of high acceleration forces due to an accident.

The previously known longitudinal guide according to the previously mentioned DE-C-31 43 431 consists of an inner, embraced track and an outer embracing track. The inner track exhibits outward spring action, while the outer track exhibits inward spring action. These preloaded forces oppose each other in the area of the guiding means, and the guiding means are kept in position by means of the preload forces.

SUMMARY OF THE INVENTION

The invention has the task of specifying a longitudinal guide with tracks manufactured of sheet steel, whereby a distinctly lower total longitudinal guide weight can be obtained as compared to the type of construction known to date.

The use of steel with at least 0.35 weight %, preferably at least 0.6 weight % carbon represents a departure from the basic sheet metals used in the automobile industry, that is, types of steel with low C-content that can be spot welded. These grades of steel are known for having high ductility. It is known that such types of steel can be surface hardened, for example, by nitrating. In this case the surface hardness is clearly increased, while the volume ductility is maintained.

Heat treatment following the production of the actual track profile, in particular the process of tempering tracks that are already shaped, is uncommon in the automobile industry, in practice this is not used for chassis parts of motor vehicles. It must be anticipated that, in particular in the case of elongated tracks of a longitudinal guide, the profiles of the tracks will deform through heat treatment, and that they will bend like a bow. However, this can be prevented by properly shaping the track profiles.

Furthermore, the ductility value decreases substantially as a result of heat treatment. The steel becomes more brittle, a condition which is undesirable in vehicle chassis construction.

The tracks of the longitudinal guide featuring the characteristics of patent claim 1 have a substantially higher fundamental strength than the tracks produced to date. This leads to the fact that the selected metal need not be as thick, and therefore this contributes to the desired weight savings. Thus, for example, twice the strength can be obtained as a minimum value using the tracks according to the invention. The decisive factor for the tensile strength of a track is the area related moment of inertia. It is proportional to the third power of the thickness of the sheet steel used. At twice the tensile strength, using, for example, sheet steel 2 mm thick, the same moment of inertia is obtained as with the reference steel, that is, the steel of low C-content that is commonly used in automobile manufacturing. This leads to a savings in weight of approximately 25% for a track. Even greater weight savings can be anticipated, since higher tensile strength values can easily be obtained as compared to the steels commonly used in the automobile industry.

Moreover, the steel used in the tracks according to the invention has a higher modulus of elasticity. This leads to a higher elasticity of the tracks per se. This higher elasticity can be used to accommodate greater tolerances. During the production of tracks according to the invention decreased production precision is required as compared to the current state of the art.

The higher elasticity of the tracks according to the invention can also be used to increase the preload between the two tracks of a longitudinal guide as compared to the state of the art. This results in the fact that the guiding means do not rattle, even under high load. The higher preload leads to higher friction forces and therefore to a higher force requirement for moving the tracks relative to each other. This intrinsically negative effect can be countered by the fact that the guiding means are not designed using sliding bodies or sliding surfaces, but rather with rolling bodies.

If sheet steel types exhibiting the previously mentioned minimum carbon content are used, welded connections to accessory parts such as shackles for mounting a belt lock and cross members for connecting the floor or seat tracks of the two longitudinal guides of a vehicle seat or similar, in particular spot welded connections, are no longer possible. Reference has already been made to this. In the case of the longitudinal guide according to the invention, such parts are connected to the tracks by means of rivets. This leads to a departure from the fastening method common to date in motor vehicle assembly.

Euronorms 20-74, which stipulate the definition and classification of steel grades, are part of the content of the disclosure of the present application, as are Euronorms 52-67, 52-83, and DIN 17 014, relating to the heat treatment of ferrous materials.

Hardening followed by subsequent tempering of the manufactured tracks has proven to be the preferred heat treatment method. As an example tracks are heated to 950° C., kept at this temperature for a certain amount of time and thereafter chilled in a liquid, preferably oil, and subsequently tempered to approximately 500° C. During hardening, Austenitization takes place, the tracks are heated to above a temperature of $Ac_1$ and then kept at that temperature, where Austenite begins to form at the given rate of heating. By alloying this steel with contents of Mn, Cr, Mo and or Ni of approximately 1–3%, depth hardening can be improved. But, since sheet steels having a sheet thickness of 2 mm are typically processed, such a measure is generally not required.

The sheet steels from which the tracks according to the invention are manufactured have, following heat treatment, a minimum tensile strength of $800N/mm^2$. Nearly twice this minimum tensile strength (e g. $1500N/mm^2$) can be obtained. In this way the total weight of a longitudinal guide can be reduced even further as compared to the above mentioned example.

In order to manufacture the tracks, non-alloyed steel in particular and preferably quality steel such as construction steel is used. The advantage of the longitudinal guide according to the invention is precisely the fact that relatively economical grades of steel can be used. Alloying is not necessary. In this respect the reduction in total weight is not achieved through the necessity of utilizing costlier grades of steel. However, this does not exclude the use of alloyed steel for the tracks of the longitudinal guide, insofar as the required minimal C-content is provided.

In a preferred embodiment of the invention (as viewed in the profile of the longitudinal guide) only two guiding means are provided, and both of them utilize-roller bodies. The forces which are hereby necessary to move the two longitudinal guides of a vehicle seat are low, despite the high preloads. Insufficient parallelism of the two longitudinal guides of a vehicle seat leads to fewer problems than previously, as a result of the higher elasticity.

The shape of the profile of the two tracks of a longitudinal guide may be selected as desired within the limits mentioned above. However, it is advantageous to have at least 30% of the total profile cross section of each track point in a direction which includes as wide an angle as possible, preferably 90°, with respect to the direction in which the major portion of the profile cross section extends. With regard to the stability of the sliding guide as relates to pulling out, it has been proven advantageous to have as large a part of the profile cross section as possible extend in the vertical direction, that is, in the direction in which the belt tractive forces essentially act. At least 30% of the profile cross section should then run in the horizontal direction. A projection into the vertical, respectively the horizontal direction is made for those areas of the profile cross section which run neither vertically nor horizontally. Dividing the portions of the profile cross sections into 2 directions which extend in essentially perpendicular directions results in preventing the tracks from deforming during heat treatment, and they remain straight. However, a slight deformation will be tolerated due to higher elasticity and due to the resulting capacity of the tracks, which have been combined to form one longitudinal guide, to equilibrate tolerances.

Preferably, both tracks of the longitudinal guide are manufactured of sheet steel having the same thickness. Furthermore, it has been proven advantageous for both tracks to feature profiles that coincide as much as possible. For example, this is achieved by having each of the two tracks consist essentially of one coaxial area which is formed by two arms which run at a right angle to each other, for example, positioned so as to mutually form a U-shape. Only relatively small parts of the total cross section of the profile are used for the alternating, contact-free engagement of the two tracks. This portion, for example, is below 20%.

Finally, if possible, it has been proven advantageous to design the profiles of each of the two tracks with folding symmetry or at least close to folding symmetry. The folding or mirror symmetry plane in this case runs through a line connecting the two roller body guides or extends as a central, vertical line of the connecting area of the two roller body guides. In profiles of that type it has been shown that both roller body guides can essentially absorb the preload forces equally.

BRIEF DESCRIPTION OF THE DRAWINGS

Further advantages and characteristics of the invention result from the other claims as well as from the exemplified embodiments of the invention that follow, which are not to be understood as limiting and which are further clarified in the following with reference to the drawing. This drawing shows:

DETAILED DESCRIPTION OF THE PREFERRED EMBODIMENTS

Figure 1:
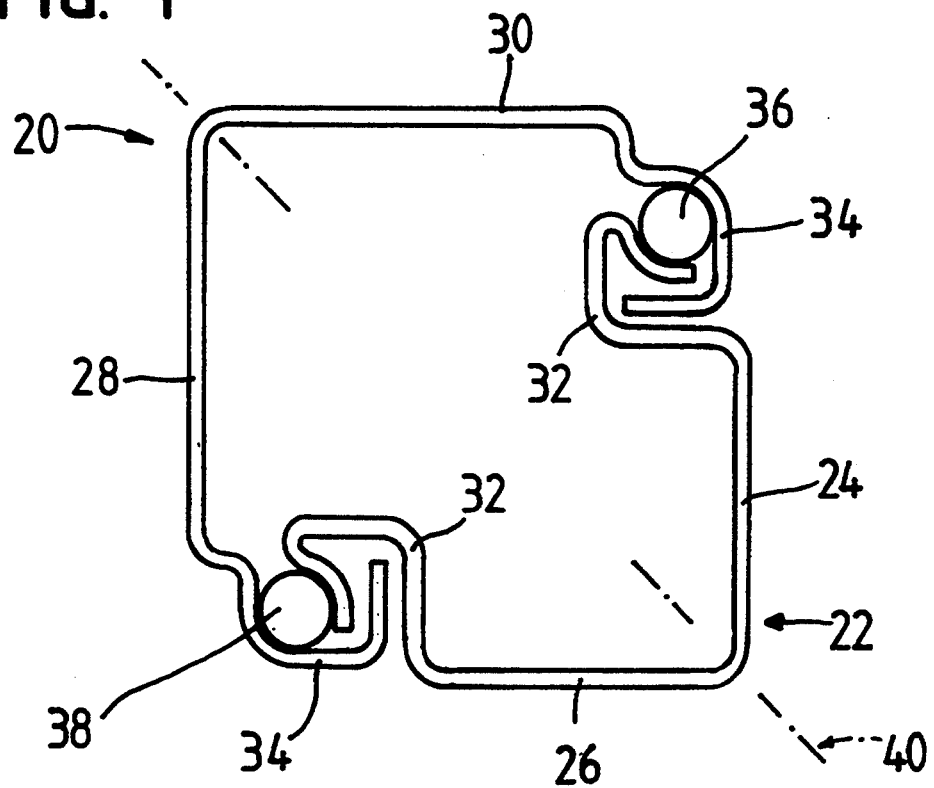
FIG. 1 a front view (profile view) of a longitudinal guide with an essentially square overall cross section, and FIG. 2 a view according to FIG. 1 onto an exemplified embodiment with two superposed roller guides.

The longitudinal guide according to both figures consists respectively of two tracks 20 and 22, track 20 of which is the outer, embracing track, while track 22 is the inner, embraced track. In the exemplified embodiment according to FIG. 1 the inner track 22 consists of two arms 24 and 26, which extend at 90° with respect to each other, are of equivalent length and, both together, represent more than half the cross sectional area of the rail. Likewise, the outer track 20 features 2 arms 28 and 30, in this case the two arms 28 and 30, which are also the same length, represent more than 60% of the cross sectional area of the entire outer track 20.

Both tracks 20 and 22 are composed of C35 steel of the same thickness. The sheet steel used therefore contains 0.35 weight % carbon. After angling a sheet metal blank into the profile shape shown in FIG. 1, the individual track is heated in a furnace to 950° C., is kept at this temperature for several minutes and is subsequently chilled in an oil bath. Thereafter it will be heated again to 500° C. The track thus completed is then ready for assembly into a longitudinal guide as shown in FIG. 1.

Both tracks 20 and 22 feature hook-in zones 32 and 34 respectively, at the marginal areas of their profiles, said hook-in zones extending essentially in a U-shape and engaging alternately into each other. These are located at opposing corners of the essentially square overall cross section of the longitudinal guide. Two rows of guiding means are also located there, in this case balls 36 and 38. They are held in position by the preload on the tracks 20 and 22. Both profile ends spring as a result of the preload, that is, the hook-in zones 32 of the inner track 22 spring outward. Both profile ends, that is the hook-in zones 34 of the outer track 20, however, spring toward the inside. The balls 36 and 38 are respectively located between the curved areas of the profiles of the tracks 20 and 22, the balls are fixed between these curved areas by means of the preload.

Both rails have a folding symmetry profile, they have mirror like symmetry with respect to a symmetry plane 40. The discussed preload forces run essentially at a right angle to this symmetry plane 40. In the case of both tracks 20 and 22, 50% of the cross sectional area extend in one direction and 50% of the cross sectional area extend in a direction at a right angle to this direction.

Figure 2:
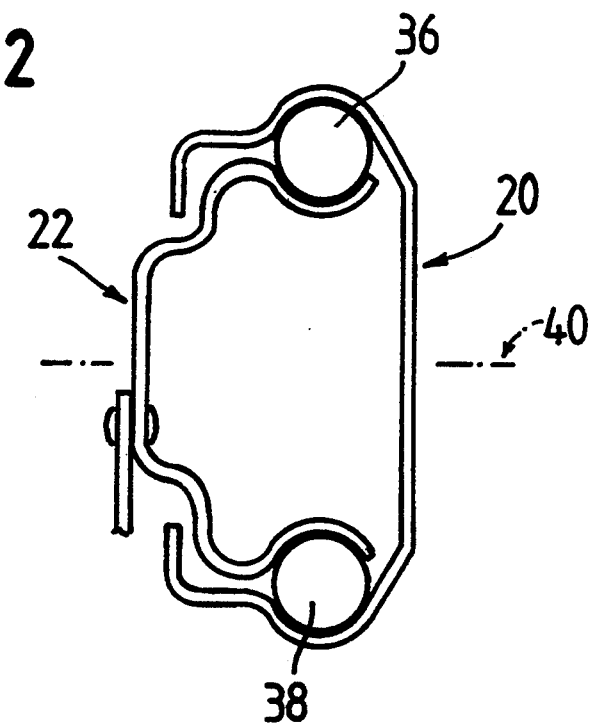

The track profile according to FIG. 2 is shown in the position in which it is preferably used in a motor vehicle. In this case the two balls 36 and 38 are each arranged in rows vertically above each other. In detail, the longitudinal guide according to FIG. 2 consists of an essentially C-shaped outer track 20 and an essentially hat shaped inner track 22. Both track profiles have folding symmetry with a symmetry plane 40. This, in turn, is true of the entire profile of the longitudinal guide, including the balls 36 and 38, as is shown in the exemplified embodiment according to FIG. 1. In both tracks 20 and 22 a relatively large part of the profile cross section runs in a vertical direction in the preferred installation, that portion is more than 60%, respectively 70%. This results in a high area related moment of inertia in this direction. With respect to FIG. 2, there is also shown a part, such as, for example, a shackle for mounting the lock for a safety belt, attached by rivets to the tracks 20 and 22.

We claim:

1. Longitudinal guide for longitudinal adjustment devices for vehicle seats with two elongated tracks (20, 22) that slide relative to each other and
   between which guiding means are arranged, of which there are at least two, and of which at least one is constructed using roller bodies,
   with one track that embraces the other,
   with the tracks interconnected such that they will not separate, and
   with the tracks positioned in an adjoined, preloaded manner, characterized by the fact that the tracks (20, 22) are manufacture of a sheet steel containing at least 0.35% carbon content and that the tracks (20, 22) are heat treated after they are completed.

2. Longitudinal guide according to claim 1, wherein the roller bodies are balls.

3. Longitudinal guide according to claim 1, characterized by the fact that both tracks (20, 22) have at least two arms (24, 26, 28, 30) which together form an L-profile.

4. Longitudinal guide according to claim 3, characterized by the fact that at least one track features three arms which together form a U-profile.

5. Longitudinal guide according to claim 1, characterized by the fact that the tracks (20, 22), in the marginal areas of their profile cross section, feature angled, hook shaped flanges which engage each other alternately and in a contact-free manner.

6. Longitudinal guide according to claim 1, characterized by the fact that at least one of said tracks (20 or 22) features a mirror symmetry plane (40).

7. Longitudinal guide according to claim 1, characterized by the fact that parts connected to the tracks (20, 22), are attached by means of rivets.

8. Longitudinal guide according to claim 7, wherein said parts include a shackle for mounting the lock of a safety belt.

9. Longitudinal guide according to claim 1, characterized by the fact that the longitudinal guide features only two guiding means, both of which are equipped with roller bodies.

10. Longitudinal guide according to claim 5, characterized by the fact that parts connected to the tracks (20, 22), are attached by means of rivets.

11. Longitudinal guide according to claim 10, wherein said parts include a shackle for mounting the lock of a safety belt.

12. Longitudinal guide according to claim 1, characterized by the fact that the tracks (20, 22) are manufactured of an non-alloyed steel.

13. Longitudinal guide according to claim 12, characterized by the fact that the longitudinal guide features only two guiding means, both of which are equipped with roller bodies.

14. Longitudinal guide according to claim 12, wherein said non-alloyed steel is construction steel.

15. Longitudinal guide according to claim 12, characterized by the fact that parts connected to the tracks (20, 22), are attached by means of rivets.

16. Longitudinal guide according to claim 15, wherein said parts include a shackle for mounting the lock of a safety belt.

17. Longitudinal guide according to claim 1, characterized by the fact that the tracks (20, 22) have a minimum tensile strength of $800N/mm^2$.

18. Longitudinal guide according to claim 17, characterized by the fact that the longitudinal guide features only two guiding means, both of which are equipped with roller bodies.

19. Longitudinal guide according to claim 17, characterized by the fact that the tracks (20, 22) are manufactured of an non-alloyed steel.

20. Longitudinal guide according to claim 19, wherein said non-alloyed steel is construction steel.

21. Longitudinal guide according to claim 3, characterized by the fact that parts connected to the tracks (20, 22), are attached by means of rivets.

22. Longitudinal guide according to claim 21, wherein said parts include a shackle for mounting the lock of a safety belt.

23. Longitudinal guide according to claim 1, characterized by the fact that heat treatment tempers the tracks (20, 22) that are ready to be installed.

24. Longitudinal guide according to claim 23, characterized by the fact that the tracks (20, 22) have a minimum tensile strength of $800N/mm^2$.

25. Longitudinal guide according to claim 23, characterized by the fact that the tracks (20, 22) are manufactured of an non-alloyed steel.

26. Longitudinal guide according to claim 25, wherein said non-alloyed steel is construction steel.

27. Longitudinal guide according to claim 23, characterized by the fact that the longitudinal guide features only two guiding means, both of which are equipped with roller bodies.

28. Longitudinal guide according to claim 23, characterized by the fact that parts connected to the tracks (20, 22), are attached by means of rivets.

29. Longitudinal guide according to claim 28, wherein said parts include a shackle for mounting the lock of a safety belt.

* * * * *